United States Patent [19]

Kosaka

[11] Patent Number: 4,597,008
[45] Date of Patent: Jun. 24, 1986

[54] COLOR BURST SIGNAL IMPROVING CIRCUIT

[75] Inventor: Yoshiteru Kosaka, Zushi, Japan

[73] Assignee: Victor Company of Japan, Ltd., Yokahama, Japan

[21] Appl. No.: 511,392

[22] Filed: Jul. 6, 1983

[30] Foreign Application Priority Data

Jul. 20, 1982 [JP] Japan ................................ 57-109884

[51] Int. Cl.⁴ .................... H04N 9/64; H04N 9/45; H04N 9/455
[52] U.S. Cl. .......................................... 358/36; 358/20
[58] Field of Search .................. 358/20, 21 R, 36, 37, 358/40, 19, 319, 326

[56] References Cited

U.S. PATENT DOCUMENTS 3,978,409  8/1976  Dolby et al. ........................ 358/36
4,485,396  11/1984  Sandberg ........................ 358/36 X

FOREIGN PATENT DOCUMENTS 2845591  8/1979  Fed. Rep. of Germany .

Primary Examiner—Michael A. Masinick
Assistant Examiner—Michael P. Dunnam
Attorney, Agent, or Firm—Ladas & Parry

[57] ABSTRACT

A signal-to-noise ratio improving circuit for a color video signal comprises an adder supplied with a chrominance signal of an input color video signal, a delay circuit supplied with an output signal of the adder, for delaying the signal supplied thereto by a delay period which is in terms of one horizontal scanning period of the input color video signal and producing an output signal to the adder wherein the output signal of the delay circuit is added with the input chrominance signal, and a switching circuit supplied with the input chrominance signal and the output signal of the adder. The switching circuit passes the output signal of the adder during an interval corresponding to a color burst signal of the input chrominance signal and passes the input chrominance signal during intervals other than the color burst signal interval of the input chrominance signal.

10 Claims, 5 Drawing Figures

COLOR BURST SIGNAL IMPROVING CIRCUIT

BACKGROUND OF THE INVENTION

The present invention generally relates to signal-to-noise (S/N) ratio improving circuits for color video signals, and more particularly to a S/N ratio improving circuit for a video signal, which improves the picture quality of a picture obtained by reproducing the color video signal, by improving the S/N ratio of a color burst signal in the color video signal.

Generally, a noise component is included in a video signal which is reproduced by a video signal magnetic recording and reproducing apparatus. Conventionally, various circuits have been proposed for reducing this noise component and improving the S/N ratio of the video signal.

As one of these various conventional circuits, there was a S/N ratio improving circuit which employed a recursive filter using a one-frame delay line, as will be described hereinafter in conjunction with the drawings. In the television video signal, the correlation of the picture information is considerably high between each of the frames of the television video signal. On the other hand, there generally is no correlation between the noise components included in the video signal. Accordingly, when the video signal is averaged in terms of a period corresponding to one frame, there will be hardly any change in the energy of the video signal component, and only the energy of the noise component will decrease. The conventional S/N ratio improving circuit used this principle. Hence, the conventional S/N ratio improving circuit was designed so that the video signal is applied to one input terminal of an adder and an output of this adder is supplied to the other input terminal thereof through a one-frame delay line, and a video signal which is improved of its S/N ratio was obtained through the output of this adder.

However, according to the above conventional circuit, a signal which is delayed by one frame is supplied again to the one-frame delay line through the adder so as to be delayed by one frame, and such an operation was repeatedly carried out. Thus, different coefficients were multiplied by the two signals which were to be added in the adder before these signals were added, and the coefficients were selected so that the signal which is delayed by one frame gradually became attenuated. However, in any event, a signal component which is delayed by one or more frames was included in the output signal of the adder, and this signal component appeared as an afterimage when reproduced. Accordingly, there was no problem when the information content of the video signal was related to a still picture, however, such was generally not the case, and the information content of the video signal was more frequently related to a moving picture. Therefore, the afterimage became particularly conspicuous when the movement in the moving picture was quick, and such an afterimage was unpleasant to the viewer.

In addition, in the television video signal, the correlation between the picture information is considerably high between each of the horizontal scanning lines of the television video signal, and the so-called line correlation exists. Hence, one may consider designing the S/N ratio improving circuit in which the one-frame delay line in the conventional circuit described before is replaced by a one horizontal scanning period (1H) delay line. When such a 1H delay line is employed and the video signal is averaged in terms of 1H, it is possible to reduce only the energy of the noise component without reducing the energy of the video signal component, as in the case of the conventional circuit described before.

However, according to the S/N ratio improving circuit which one may consider designing, a signal component which is delayed by 1H or more horizontal scanning periods is included in the output signal of the adder. For this reason, if there is a sudden change in the information content along the vertical direction of the picture, there will be a run in the color picture from a point where the change occurs throughout several lines below that point. Although there is line correlation in the picture content, strictly speaking, the picture content is generally different for each line except for the case where the picture is entirely of the same color. Hence, even though the S/N ratio is improved by the S/N ratio improving circuit, there is a disadvantage in that the color will run towards the lower part of the picture. This run in the color will become worse if an attempt is made to improve the S/N ratio. On the other hand, if an attempt is made to reduce the run in the color, the S/N ratio cannot be improved considerably, and the reduction of the run in the color and the improvement of the S/N ratio cannot be satisfactorily realized simultaneously.

On the other hand, when a noise component exists in the color video signal, this noise exists in both the video information signal portion and the color burst signal portion of the color video signal. When the noise exists in the video information signal portion, degradation is introduced in the picture quality of the reproduced picture due to this noise itself. Further, when the noise exists in the color burst signal portion, the phase of the color burst signal is affected by this noise and becomes unstable. Thus, in this case where the noise exists in the color burst signal portion, the phase of an output signal of a burst control oscillator for producing a local subcarrier signal in a receiver becomes unstable. The phases of the burst signal and the chrominance signal must constantly be maintained to their correct phases, however, when there is change in the phase due to the noise as described above, degradation will be introduced in the picture quality of the reproduced picture.

Accordingly, the present inventor has noted that the picture quality of the reproduced picture can be improved considerably if the noise existing in the burst signal portion is reduced, even if the noise existing in the video information signal portion is not reduced considerably or not reduced at all. Moreover, unlike the video information, the color burst signal will not differ for each of the horizontal scanning periods, and is always constant. That is, correlation exists with respect to the color burst signal. The present inventor has effectively used these characteristics.

SUMMARY OF THE INVENTION

Accordingly, it is a general object of the present invention to provide a novel and useful S/N ratio improving circuit for a color video signal, in which the above described disadvantages have been overcome.

Another and more specific object of the present invention is to provide a S/N ratio improving circuit for a color video signal in which the S/N ratio is improved with a large S/N ratio improvement factor with respect to a color burst signal interval of the color video signal, and the S/N ratio is not improved or improved with a small S/N ratio improvement factor with respect to intervals of the color video signal other than the color burst signal interval. According to the circuit of the present invention, the picture quality of the reproduced picture is improved because the S/N ratio improvement factor with respect to the color burst signal is large, and in addition, undesirable phenomenons such as run in the color will not occur.

Other objects and further features of the present invention will be apparent from the following detailed description when read in conjunction with the accompanying drawings.

DETAILED DESCRIPTION

Figure 1:
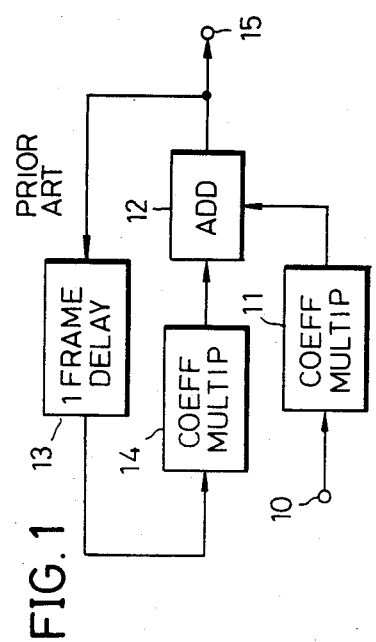
FIG. 1 is a systematic block diagram showing an example of a conventional S/N ratio improving circuit for a color video signal.

First, description will be given with respect to an example of a conventional S/N ratio improving circuit for a color video signal, by referring to FIG. 1. A color video signal comprising a chrominance signal and a luminance signal, and including a noise signal component, is applied to an input terminal 10. The color video signal applied to the input terminal 10, is multiplied with a coefficient (1−k) in a coefficient multiplier 11, and then applied to one input terminal of an adder 12. An output of the adder 12 is delayed by one frame period in a one-frame delay line 13. The delayed signal from the delay line 13 is multiplied with a coefficient K (K is less than 1) in a coefficient multiplier 14, and then applied to the other input terminal of the adder 12 wherein this signal is added with the input signal obtained through the input terminal 10.

When the signal from the input terminal 10 and the output signal of the adder 12 which has passed through the delay line 13 are added in the adder 12, the noise signal components are cancelled in the adder 12 because the noise signal does not have correlation between frames. No problems will be introduced with respect to the video signal since the video signal has correlation between frames. Accordingly, the output signal of the adder 12 is obtained through an output terminal 15 as an output color video signal reduced of its noise signal component.

If the coefficients in the coefficient multipliers 11 and 13 are respectively assumed to be (1−K) and K, a signal-to-noise (S/N) ratio improvement factor G of the output color video signal obtained through the output terminal 15 can be described by the following equation.

$$G = 20 \log_{10} \sqrt{(1 + K)/(1 - K)} \quad (dB)$$

If K=0.95, for example, the S/N ratio improvement factor G becomes approximately equal to 16 dB (approximately 6.2 times), and the S/N ratio can be improved considerably.

However, when the values of the coefficients (1−K) and K are selected so that the S/N ratio improvement factor G becomes large, although the S/N ratio is improved considerably, there will be a frame signal component remaining in a loop including the delay line 13 and the adder 12. This frame signal component is the component which is delayed by one or more frames by the delay line 13, and this remaining frame signal component will increase in its magnitude as the S/N ratio improvement factor G becomes large. Accordingly, as described previously, there was a disadvantage in that an afterimage introduced in the reproduced picture due to the frame signal component became conspicuous as the S/N ratio improvement factor G becomes large, and such an afterimage was unpleasant to the viewer.

On the other hand, as described before, as a method of preventing the introduction of the afterimage in the reproduced picture and still improve the S/N ratio, a 1H delay line may be used instead of the one frame delay line 13. In this case, the S/N ratio improvement factor G can be described by the same equation which was given before. According to this S/N ratio improving circuit, the afterimage will not occur. However, if the S/N ratio improvement factor G becomes large, run in the color will be introduced towards the lower part of the reproduced picture due to a signal which is delayed by 1H or more horizontal scanning periods. Such a run in the color becomes more conspicuous as the S/N ratio improvement factor G becomes larger. On the other hand, the S/N ratio improvement factor G may be reduced in order to reduce the effect of this run in the color, however, the picture quality of the reproduced picture will not be improved to a satisfactory extent by such a reduced S/N ratio improvement factor. In this case, if the run in the color is taken into consideration, the S/N ratio improvement factor G can only be set to a value in the range of 4 dB to 5 dB in practice.

Accordingly, as described previously, the present inventor noted that the run in the color did not occur even when the S/N ratio improvement factor of the color burst signal is set to a large value. The present inventor further noted that the phenomenon in which degradation is introduced in the picture quality of the reproduced picture, as the phase of the entire picture changes due to change in the phase of the color burst signal caused by the noise signal, will not occur if the S/N ratio of the color burst signal is improved. The present invention was derived by noting these characteristics.

Description will now be given with respect to a first embodiment of a S/N ratio improving circuit according to the present invention, by referring to FIG. 2. A color video signal which is reproduced from a magnetic tape 20 by a rotary magnetic head 21, is supplied to a lowpass filter 23 and a highpass filter 24, through a preamplifier 22. The chrominance signal which is separated in the lowpass filter 23, is subjected to a signal processing in a known signal processing circuit 25 which includes a frequency modulator and the like. On the other hand, the luminance signal which is separated in the highpass filter 24, is subjected to a signal processing in a known signal processing circuit 30 which includes a limiter, frequency demodulator, and the like.

Figure 3:
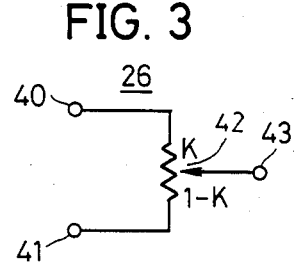
FIG. 3 is a circuit diagram showing an example of an adder shown in FIG. 2.

An output chrominance signal of the signal processing circuit 25 is supplied to an adder 26 and a contact b of a switch 29. The adder 26 comprises a variable resistor 42 shown in FIG. 3, for example. An output delayed chrominance signal of a 1H (one-horizontal scanning period) delay line 27 is applied to one terminal of the variable resistor 42, through a terminal 40. The output chrominance signal of the signal processing circuit 25 is applied to the other terminal of the variable resistor 42, through a terminal 41. A signal from a slider of the variable resistor 42 which is obtained through an output terminal 43, is a signal obtained by adding two signals. These two signals respectively are a signal obtained by multiplying the coefficient K to an output signal of the 1H delay line 27, and a signal obtained by multiplying the coefficient (1−K) to the output chrominance signal of the signal processing circuit 25. The value of the coefficient K is variably set according to the position of the slider in the variable resistor 42. As the slider of the variable resistor 42 is moved upwards in FIG. 3, the value of the coefficient K increases, and the value of the coefficient (1−K) decreases. On the contrary, as the slider of the variable resistor 42 is moved downwards in FIG. 3, the value of the coefficient K decreases while the value of the coefficient (1−K) increases.

The added output chrominance signal from the variable resistor 42 (adder 26), which is obtained through the output terminal 43, is delayed by 1H on one hand in the 1H delay line 27. The delayed output chrominance signal of the 1H delay line 27 is applied to the terminal 40 of the adder 26, and added with the chrominance signal applied to the terminal 41 from the signal processing circuit 25. Because the noise component has no line correlation, the noise component in the chrominance signal obtained from the signal processing circuit 25 is cancelled when this chrominance signal from the signal processing circuit 25 is added with the chrominance signal from the 1H delay line 27. The S/N ratio improvement factor G obtained as a result of the addition in the adder 26, can be described by the same equation for the S/N ratio improvement factor in the conventional example using the one-frame delay line 13 which was described before. In the present embodiment, the value of the coefficient K is set to 0.95, and the S/N ratio improvement factor G is large and is approximately equal to 16 dB (approximately 6.2 times).

On the other hand, the output chrominance signal of the adder 26 is supplied to a level adjustor 28 wherein the signal level is adjusted so as to be matched with the level of the chrominance signal which is applied to the contact b of the switch 29 from the signal processing circuit 25. An output signal of the level adjustor 28 is applied to a contact a of the switch 29.

The output luminance signal of the signal processing circuit 30 is supplied to an adder 35 and a synchronizing signal separator 31. A horizontal synchronizing signal which is separated in the synchronizing signal separator 31 triggers a monostable multivibrator 32. Thus, a signal which does not include an equalizing pulse is obtained from the monostable multivibrator 32, and supplied to a monostable multivibrator 33. A signal is generated from the monostable multivibrator 33 in correspondence with the position of the color burst signal. The width of this signal from the monostable multivibrator 33 is set in a monostable multivibrator 34 and is thus formed into a burst gate signal. The output burst gate signal of the monostable multivibrator 34 is applied to the switch 29 as a switching signal.

A movable contact of the switch 29 is normally connected to the contact b, and switches over and connects to a contact a while the switching signal from the monostable multivibrator 34 is applied to the switch 29. Accordingly, the color burst signal which is cancelled and reduced of its noise, which is obtained from the adder 26 through the contact a, only passes through the switch 29 during an interval corresponding to the color burst signal of the color video signal. During intervals other than the color burst signal interval, the chrominance signal which is obtained from the signal processing circuit 25 through the contact b passes through the switch 29. The signal which has passed through the switch 29, is supplied to the adder 35 wherein the signal is added with the luminance signal from the signal processing circuit 30. A color video signal in which the noise in the color burst signal is reduced and the S/N ratio of the color burst signal is improved, is obtained through an output terminal 36 and supplied to a television receiver.

Figure 4:
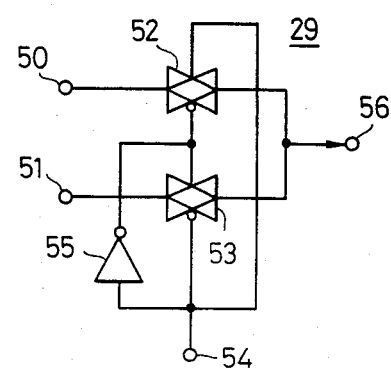
FIG. 4 is a circuit diagram showing an example of a switch shown in FIG. 2.

A known high-speed analog switching circuit comprising C-MOS transistors 52 and 53 having their N-channel and P-channel connected, and an inverter 55 as shown in FIG. 4, may be used for the switch 29, for example. The output signal of the level adjustor 28 and the output signal of the signal processing circuit 25, are respectively applied to terminals 50 and 51. The output switching signal of the monostable multivibrator 34 is applied to a terminal 54. A signal which has been selectively switched and passed, is obtained through an output terminal 56. This high-speed analog switching circuit is generally known as a MOS IC 4066, and for example, a chip CD4066 manufactured by RCA Corporation of the United States and a chip μPD4066 manufactured by Nippon Electric Co., Ltd. of Japan may be used.

According to the circuit of the present embodiment, the noise component remains in the video information signal interval other than the color burst signal interval, however, the noise component in the color burst signal interval is eliminated. Thus, the phase of the color burst signal will not be changed by the noise component, and will always remain constant. Accordingly, compared to the case where the noise component exists in the color burst signal, the picture quality of the reproduced picture is considerably improved according to the present embodiment. In addition, unlike the case where the S/N ratio is greatly improved with respect to the entire chrominance signal, the run in the color will not occur at all in the reproduced picture due to the delay in the chrominance information even if the S/N ratio improvement factor G is set to a large value, because the S/N ratio is improved only with respect to the color burst signal interval of the color video signal according to the present embodiment.

Figure 5:
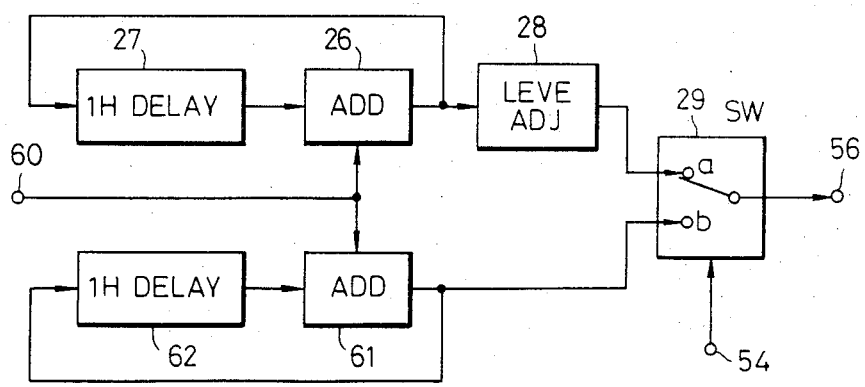
FIG. 5 is a circuit diagram showing a second embodiment of an S/N ratio improving circuit for a color video signal according to the present invention.

Next, description will be given with respect to an essential part of a second embodiment of a S/N ratio improving circuit for a color video signal according to the present invention, by referring to FIG. 5. In FIG. 5, those parts which are the same as those corresponding parts in FIGS. 2 and 4 are designated by the same reference numerals, and their description will be omitted.

Figure 2:
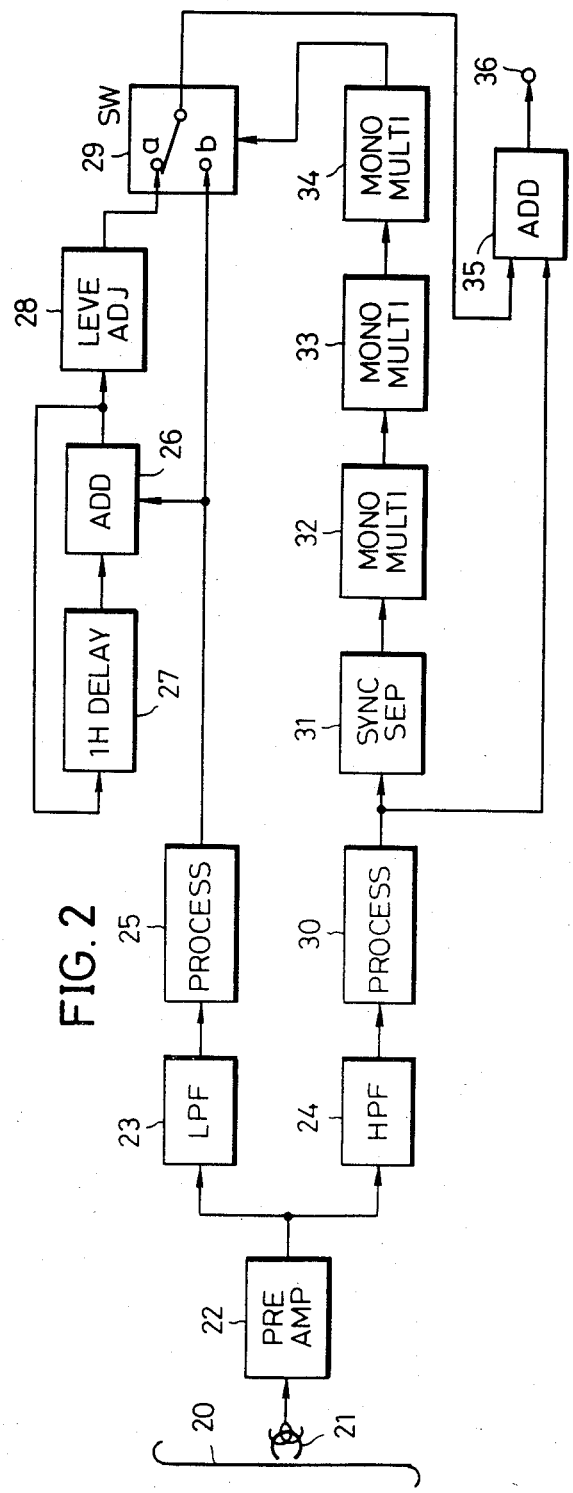
FIG. 2 is a systematic block diagram showing a first embodiment of an S/N ratio improving circuit for a color video signal according to the present invention.

The circuit shown in FIG. 5 is used instead of the adder 26, the 1H delay line 27, the level adjustor 28, and the switch shown in FIG. 2. The chrominance signal from the signal processing circuit 25 is applied to a terminal 60, and then supplied to the adder 26 and an adder 61. An output of the adder 61 is supplied to the contact b of the switch 29, and on the other hand, delayed by 1H in a 1H delay line 62 and supplied to the adder 61. A circuit comprising the adder 61 and the 1H delay line 62, constitutes a S/N ratio improving circuit as in the case of the circuit comprising the adder 26 and the 1H delay line 27.

In the S/N ratio improving circuit comprising the adder 26 and the 1H delay line 27, the value of coefficients $K_1$ and $(1-K_1)$ in the adder 26 are selected so that S/N ratio improvement factor G of the S/N ratio improving circuit assumes a large value of approximately 16 dB (approximately 6.2 times) as in the case of the first embodiment described previously. In this case, the coefficient $K_1$ is approximately equal to 0.95 and the coefficient $(1-K_1)$ is approximately equal to 0.05. On the other hand, in the S/N ratio improving circuit comprising the adder 61 and the 1H delay line 62, the S/N ratio improvement factor G is set to a small value such as 4.4 dB (approximately 1.6 times), for example, that is, to a small value in a range such that the run in the color in the reproduced picture does not become a problem from the practical point of view. In order to set the S/N ratio improvement factor G to such a small value, the value of a coefficient $K_2$ which is multiplied by the output signal of the 1H delay line 62 before carrying out the addition in the adder 61, is set to 0.25. Accordingly, a coefficient $(1-K_2)$ which is multiplied to the input chrominance signal from the terminal 60, is set to 0.75.

The switching signal from the monostable multivibrator 34 is applied to the terminal 54 of the switch 29. The color burst signal which is greatly improved of its S/N ratio, is obtained through the contact a and produced through the output terminal 56 of the switch 29 during the color burst signal interval of the color video signal. During other intervals of the color video signal, the chrominance information signal which is improved of its S/N ratio to a small extent is obtained through the contact b and produced through the output terminal 56 of the switch 29. The signal produced through the output terminal 56 of the switch 29, is supplied to the adder 35 wherein the signal is added and accordingly mixed with the luminance signal.

According to the first embodiment described before, the S/N ratio is not directly improved with respect to the chrominance information signal interval which is an interval other than the color burst signal interval of the color video signal. However, according to the second embodiment, the S/N ratio is also improved with respect to the chrominance information signal interval of the color video signal, and for this reason, it is possible to obtain a reproduced picture of high picture quality in which the noise is further reduced compared to the first embodiment.

In the embodiments described heretofore, description was given for a case where the color video signal is an NTSC system color video signal which has line correlation for every 1H of the color video signal. However, if the color video signal is a PAL system color video signal which has line correlation for every 2H, 2H delay lines may be used instead of the 1H delay lines 27 and 62.

There is a system which amplifies the level of the color burst signal into twice its original level for recording in a color video signal recording system, and attenuates the level of the color burst signal to ½ to restore the level to its original level in a reproducing system upon reproduction, so that the effect of noise in the color burst signal is relatively reduced. When the present invention is applied to this system, it is possible to commonly use the level adjustor 28 as both the level adjustor and a ½-attenuator for attenuating the level of the color burst signal in the above reproducing system.

Further, the present invention is not limited to these embodiments, but various variations and modifications may be made without departing from the scope of the present invention.

What is claimed is:

1. A color burst signal improving circuit for improving a quality of color picture which is reproduced from an input color video signal, said improving circuit comprising:
   adding means supplied with a chrominance signal of said input color video signal;
   delay means supplied with an output signal of said adding means, for delaying the signal supplied thereto by a predetermined delay period which is one horizontal scanning period of said input color video signal for the NTSC system and two horizontal scanning periods of said input color video signal for the PAL system, said delay means producing an output signal which is supplied to said adding means wherein the output signal of said delay means is added with said chrominance signal; and
   switching means supplied with said chrominance signal and the output signal of said adding means, for passing the output signal of said adding means only during a burst period of a color burst signal of said chrominance signal and for passing said chrominance signal during a period other than said burst period.

2. A color burst signal improving circuit as claimed in claim 1 which further comprises separating means for separating a chrominance signal and a luminance signal from the input color video signal, the chrominance signal separated in said separating means being supplied to said adding means and said switching means, and means for mixing the luminance signal separated in said separating means and the output signal of said switching means to obtain a color video signal.

3. A color burst signal improving circuit as claimed in claim 1 in which said switching means comprises a switching signal forming circuit for forming a switching signal which exists in a burst period of the color burst signal of said chrominance signal, and a switching circuit supplied with said chrominance signal and the output signal of said adding means, for carrying out switching according to the switching signal applied thereto from said switching signal forming circuit so as to pass the output signal of said adding means only during the burst period and pass said chrominance signal during the period other than the burst period.

4. A color burst signal improving circuit as claimed in claim 3 which further comprises separating means for separating a chrominance signal and a luminance signal from the input color video signal, the chrominance signal separated in said separating means being supplied to said adding means and said switching means, and means for mixing the luminance signal separated in said separating means and the output signal of said switching means to obtain a color video signal, and said switching signal forming circuit comprises a circuit for separating a horizontal synchronizing signal from the luminance signal separated by said separating means and a circuit for forming said switching signal from the separated horizontal synchronizing signal.

5. A color burst signal improving circuit as claimed in claim 1 in which said adding means carries out addition of the output signal of said delay means multiplied by a coefficient K and said chrominance signal multiplied by a coefficient (1−K).

6. A color burst signal improving circuit as claimed in claim 5 in which said adding means comprises a variable resistor applied with the output signal of said delay means to one terminal thereof and said chrominance signal applied to another terminal thereof and obtains the output signal of said adding means through a slider thereof.

7. A color burst signal improving circuit as claimed in claim 5 in which the value of the coefficient K in said adding means is selected approximately equal to 0.95.

8. A color burst signal improving circuit for improving a quality of a color picture which is reproduced from an input color video signal, said improving circuit comprising:

first adding means supplied with a chrominance signal of said input color video signal;

first delay means supplied with an output signal of said first adding means, for delaying the signal supplied thereto by a predetermined delay period which is one horizontal scanning period of said input color video signal for the NTSC system and two horizontal scanning periods of said input color video signal for the PAL system, said first delay means producing an output signal which is supplied to said first adding means wherein the output signal of said first delay means is added with said chrominance signal, said first adding means carrying out addition of the output signal of said first delay means multiplied by a coefficient $K_1$ and said chrominance signal multiplied by a coefficient $(1-K_1)$;

second adding means supplied with the chrominance signal of said input color video signal;

second delay means supplied with an output signal of said second adding means, for delaying the signal supplied thereto by a predetermined delay period which is one horizontal scanning period of said input color video signal for the NTSC system and two horizontal scanning periods of said input color video signal for the PAL system, said second delay means producing an output signal which is supplied to said second adding means wherein the output signal of said second delay means is added with said chrominance signal, said second adding means carrying out addition of the output signal of said second delay means multiplied by a coefficient $K_2$ and said chrominance signal multiplied by a coefficient $(1-K_2)$, where $K_1$ is greater than $K_2$; and switching means supplied with the output signals of said first and second adding means, for passing the output signal of said first adding means only during a burst period of a color burst signal of said chrominance signal and for passing the output signal of said second adding means during a period other than said burst period.

9. A color burst signal improving circuit as claimed in claim 8 which further comprises separating means for separating a chrominance signal and a luminance signal from the input color video signal, the chrominance signal separated in said separating means being supplied to said first and second adding means, and means for mixing the luminance signal separated in said separating means and the output signal of said switching means to obtain a color video signal.

10. A color burst signal improving circuit as claimed in claim 8 in which the value of the coefficient $K_1$ in said first adding means is selected approximately equal to 0.95, and the value of the coefficient $K_2$ in said second adding means is selected approximately equal to 0.25.

* * * * *